(12) United States Patent
McAlexander et al.

(10) Patent No.: US 7,012,697 B2
(45) Date of Patent: Mar. 14, 2006

(54) HETERODYNE BASED OPTICAL SPECTRUM ANALYSIS WITH CONTROLLED OPTICAL ATTENUATION

(75) Inventors: William Ian McAlexander, Redwood City, CA (US); Douglas M. Baney, Los Altos, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 461 days.

(21) Appl. No.: 10/279,436

(22) Filed: Oct. 24, 2002

(65) Prior Publication Data

US 2004/0080753 A1 Apr. 29, 2004

(51) Int. Cl.
*G01B 9/02* (2006.01)

(52) U.S. Cl. ...................................................... 356/484

(58) Field of Classification Search ................ 356/484, 356/477, 451, 73.1
See application file for complete search history.

(56) References Cited

U.S. PATENT DOCUMENTS

| 4,856,899 | A | 8/1989 | Iwaoka et al. |
| 5,365,335 | A | 11/1994 | Sorin |
| 6,600,594 | B1 * | 7/2003 | Ko et al. ................. 359/337 |
| 2004/0080753 | A1 * | 4/2004 | McAlexander et al. ..... 356/484 |

* cited by examiner

Primary Examiner—Andrew H. Lee

(57) ABSTRACT

An optical heterodyne detection system includes an attenuator for attenuating an input signal before the input signal is combined with a local oscillator signal. An optimal attenuation level for the input signal, which improves the signal to noise ratio of the heterodyne beat signal, is determined by obtaining a base measurement of an output signal in response to the local oscillator signal and in the absence of the input signal, obtaining sample measurements of the output signal in response to the input signal as a function of different attenuation levels, and determining the optimal attenuation level as a function of the base measurement and the sample measurements. A minimum attenuation level for the input signal, which protects receiver photodetectors from being saturated or damaged, is determined by setting an initial attenuation level and gradually reducing the attenuation level until the voltage limit of the photodetectors is reached.

17 Claims, 8 Drawing Sheets

HETERODYNE BASED OPTICAL SPECTRUM ANALYSIS WITH CONTROLLED OPTICAL ATTENUATION

CROSS-REFERENCE TO RELATED APPLICATION

The present application is related to U.S. patent application Ser. No. 09/488,149, filed 20 Jan. 2000.

FIELD OF THE INVENTION

The invention relates generally to the field of optical measurements and measuring systems, and more particularly to a method and system for optical spectrum analysis that utilizes optical heterodyne detection.

BACKGROUND OF THE INVENTION

Optical heterodyne detection systems are utilized to monitor DWDM systems because of their ability to achieve high spectral resolution. Improvements in the performance of optical heterodyne detection systems with regard to parameters such as sensitivity and dynamic range can be achieved by increasing the signal to noise ratio of the heterodyne beat signal. However, the desired heterodyne beat signal coexists with other direct detection signals. The direct detection signals in DWDM systems include intensity noise and shot noise from both the input signal and the local oscillator signal. The various noise components can mask the desired heterodyne beat signal. One technique for improving the signal to noise ratio of the heterodyne beat signal involves reducing the intensity noise by utilizing two detectors to accomplish balanced detection. Although balanced detection is useful in improving the signal to noise ratio of the heterodyne beat signal, balanced detection has limitations.

Another technique for improving the signal to noise ratio of a heterodyne beat signal involves amplifying the input signal before the input signal is combined with the local oscillator signal in order to increase the amplitude of the heterodyne beat signal and thereby increase the signal to noise ratio of the heterodyne beat signal. Although amplifying the input signal increases the amplitude of the heterodyne beat signal, the amplification also increases the intensity noise of the input signal and may not improve the signal to noise ratio of the heterodyne signal.

Another concern with optical heterodyne detection systems is that the receivers are sensitive to surges in optical signal power. For example, the photodetectors can become saturated, or even permanently damaged, when subjected to high signal powers.

In view of the limitations of known heterodyne detection systems, what is needed is an optical heterodyne detection system that generates a heterodyne beat signal with a high signal to noise ratio. In addition, what is needed is an optical heterodyne detection system that can effectively deal with surges of high signal powers.

SUMMARY OF THE INVENTION

An optical heterodyne detection system includes an attenuator for attenuating an input signal before the input signal is combined with a local oscillator signal. In accordance with the invention, an optimal attenuation level for the input signal is determined, where the optimal attenuation level improves the signal to noise ratio of the heterodyne beat signal that is generated when the input signal and the local oscillator signal are combined. Also, in accordance with the invention, a minimum attenuation level for the input signal is determined, where the minimum attenuation level protects receiver photodetectors from being saturated or damaged by a high power signal.

Other aspects and advantages of the present invention will become apparent from the following detailed description, taken in conjunction with the accompanying drawings, illustrating by way of example the principles of the invention.

DETAILED DESCRIPTION OF THE INVENTION

Figure 1:
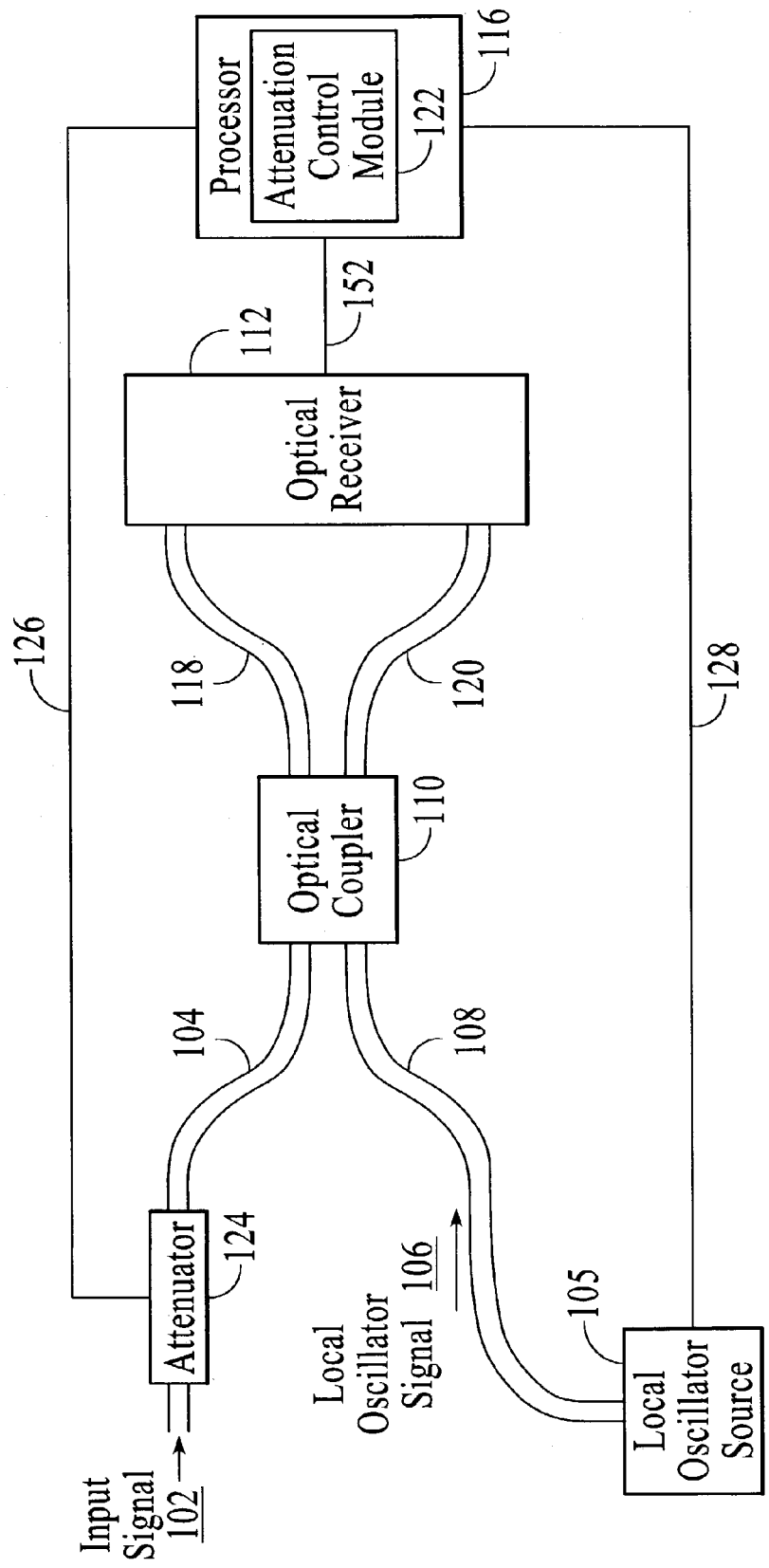
FIG. 1 depicts an embodiment of a heterodyne based optical spectrum analyzer (OSA) in which the input signal can be attenuated to improve the signal to noise ratio of the heterodyne beat signal and to protect the receiver from saturation and damage.

An optical heterodyne detection system includes an attenuator for attenuating an input signal before the input signal is combined with a local oscillator signal. In accordance with the invention, an optimal attenuation level for the input signal is determined, where the optimal attenuation level improves the signal to noise ratio of the heterodyne beat signal that is generated when the input signal and the local oscillator signal are combined. Also, in accordance with the invention, a minimum attenuation level for the input signal is determined, where the minimum attenuation level protects the photodetectors from being saturated or damaged by a high power signal.

As is known in the field of optical heterodyne detection, an input signal and local oscillator signal combine to create an optical signal having components that include intensity noise and shot noise from the input signal and the local oscillator signal, and a heterodyne beat signal. When the intensity noise of the input signal is the dominant noise source, attenuating the input signal before the input signal is combined with the local oscillator signal can improve the signal to noise ratio of the heterodyne beat signal. The signal to noise ratio of the heterodyne beat signal is improved because the intensity noise of the input signal and the heterodyne beat signal scale differently with attenuation of the input signal. Specifically, the intensity noise of the input signal is proportional to the power of the input signal ($P_S$). The relationship of the input signal intensity noise, $I_N$, to the power of the input signal is:

$$I_N \alpha\ P_S \quad (1)$$

On the other hand, the intensity of the heterodyne beat signal is proportional to the square root of the input signal, $P_S$. The relationship of the intensity of the heterodyne signal, $I_H$, to the power of the input signal is:

$$I_H \alpha \sqrt{P_s} \quad (2)$$

Because of the different scaling relationships between the intensity noise of the input signal and the heterodyne beat signal, attenuating the power of the input signal causes the intensity noise of the input signal to drop at a faster rate than the heterodyne beat signal. Because the intensity noise of the input signal drops at a faster rate than the heterodyne beat signal, the signal to noise ratio of the heterodyne beat signal ($I_H/I_N$) increases when the intensity noise of the input signal is the dominant noise source. The increased signal to noise ratio of the heterodyne signal provides a better signal for identifying a desired parameter of the input signal, thereby leading to improved detection performance when the intensity noise of the input signal is the dominant noise source. It should be noted that the signal to noise ratio of the heterodyne beat signal does not increase indefinitely with continued attenuation of the input signal. As the attenuation of the input signal is increased, eventually a noise component, or components, other than the intensity noise from the input signal will become dominant and further attenuation of the input signal will reduce the signal to noise ratio of the heterodyne beat signal. For example, at some point the electrical noise in the optical receiver may become the dominant noise source over the intensity noise of the input signal. A focus of the invention, which is described in detail below, involves techniques for finding the optimal attenuation level (i.e., the attenuation level that maximizes the signal to noise ratio).

FIG. 1 depicts an embodiment of a heterodyne based optical spectrum analyzer (OSA) in which the input signal can be attenuated to improve the signal to noise ratio of the heterodyne beat signal and to protect the receiver from saturation and damage. The heterodyne based OSA includes a signal fiber 104, an attenuator 124, a local oscillator source 105, a local oscillator fiber 108, an optical coupler 110, an optical receiver 112, a processor 116, and a feedback connection 126. It should be noted that throughout the description, similar reference numerals may be utilized to identify similar elements.

The signal fiber 104 carries an input signal 102 that is to be detected by the system. In an embodiment, the signal fiber is a single mode optical fiber as is known in the field. Throughout the description, the optical signals that are carried in optical fibers may alternatively be carried in other waveguides or in free space.

The input signal 102 includes highly coherent optical signals that are generated from conventional devices as is known in the field of optical communications systems. For example, the input signal may be generated from a single laser or multiple lasers and may consist of a single wavelength or multiple wavelengths as is known in the field of wavelength division multiplexing. The input signal is frequently modulated to carry digital information. Alternatively, the input signal could be modulated to carry analog information. Throughout the description, optical signals may include signals in the visible spectrum, the infrared spectrum, or any other optical spectrum.

In an embodiment, the input signal 102 has unknown optical characteristics that are measured by the optical spectrum analyzer. The input signal may alternatively be an optical signal that is input with known optical characteristics, in which case the optical spectrum analyzer can be utilized for optical network analysis. When the optical spectrum analyzer is utilized for optical network or component analysis, the characteristics of a network or a single component can be determined by inputting a known input signal into the network or the single component and then measuring the response to the known signal.

The attenuator 124 is an optical device that attenuates an input signal. In an embodiment, the attenuator is integrated with the input fiber 104 in order to attenuate the input signal 102. The particular type of attenuator is not critical and therefore various types of attenuators, as are known in the field of optical attenuation, may be utilized. Example attenuators include beam blocking attenuators, diffractive optics attenuators, and variable neutral density filter attenuators. Preferably, the attenuator is adjustable such that the level of attenuation can be varied as needed to control the power of the input signal that is passed to the optical coupler 110. In an embodiment, the attenuator can be adjusted to completely block transmission of the input signal. Completely blocking transmission of the input signal can be useful in establishing the optimal and minimum attenuation levels, as is described below.

In an embodiment, attenuation is applied to the input signal across the entire spectrum of the attenuator. That is, the attenuation spectrum is broad in comparison to the input signal spectrum. Additionally, in an embodiment, the level of attenuation is not wavelength dependent. That is, the level of attenuation is relatively constant across a wavelength range of interest.

The local oscillator source 105 generates a local oscillator signal 106. In an embodiment, the local oscillator source is a highly coherent tunable laser that is continuously tunable over a wavelength range of one nanometer or greater. During optical spectrum analysis, the local oscillator source generates a highly coherent local oscillator signal that is swept across a range of frequencies, or wavelengths, in order to detect the input signal over the range of frequencies or wavelengths. In an embodiment, the sweep rate of the local oscillator signal at 1,550 nanometers is approximately 40 nm/s or 6.15 MHz/$\mu$s and the sweep range is approximately 100 nm, however the sweep rate and sweep range can be higher or lower.

The local oscillator fiber 108 is an optical fiber, such as a single mode optical fiber, that carries the local oscillator signal 106 to the optical coupler 110.

The optical coupler 110 combines the input signal 102 and the swept local oscillator signal 106 onto common waveguides. As shown in FIG. 1, the optical coupler combines the input signal and the swept local oscillator signal and distributes the combined optical signal into output fibers 118 and 120. The optical coupler 110 may be an optically directional 3dB fiber coupler, although other optical couplers may be utilized. In an embodiment, the optical coupler is substantially independent of the wavelength and polarization of the input signal 102 and the swept local oscillator signal 106. In an embodiment, the optical coupler is a single mode coupler. In the embodiment of FIG. 1, the attenuator 124 is optically coupled to the optical coupler via the signal fiber 104.

The output fibers 118 and 120 are single mode optical fibers that carry two portions of the combined optical signal from the optical coupler 110 to the heterodyne receiver 112.

The optical receiver 112 is coupled to receive the combined optical signal from the optical coupler 110. The optical receiver produces an electrical output signal in response to a received optical signal. In an embodiment, the optical receiver utilizes square law detection, which results in mixing of the input signal 102 and the swept local oscillator signal 106. Mixing of the two optical signals produces a heterodyne beat signal at a frequency that is equal to the frequency difference between the input signal and the swept local oscillator signal. For highly coherent input and local oscillator signals the resulting heterodyne beat signal has a quadratic phase behavior resulting from the linearly changing frequency of the heterodyne beat signal. In an embodiment, the heterodyne beat signal is provided to the signal processor 116 via an electrical connection 152. In addition to the heterodyne beat signal, other portions of the output signal (i.e., noise components from the input and local oscillator signals) are identified at the receiver and provided to the processor.

Although the system of FIG. 1 involves providing two portions of the combined optical signal to the optical receiver, other embodiments may involve providing a single portion of the combined optical signal to the receiver. In the case of a single instance of the combined optical signal, the optical coupler needs only one output and the optical receiver needs only one photodetector. Another alternative embodiment of FIG. 1 involves providing more than two portions of the combined optical signal to the optical receiver. In an embodiment, four separate portions of the combined optical signal are provided to the optical receiver.

The processor 116 includes a multifunction processor that receives the output signal from the optical receiver 112 and generates an output that is indicative of an optical parameter, such as optical frequency, wavelength, or amplitude, of the input signal 102. The processor may include analog signal processing circuitry, digital signal processing circuitry, or software or any combination thereof, as is known in the field of signal processing. In the embodiment of FIG. 1, the processor receives digital heterodyne beat signal data from the optical receiver and the processor performs digital processing. In an alternative embodiment, the processor receives an analog heterodyne beat signal from the optical receiver and the analog signal is converted into digital data by the processor. The digital data is subsequently processed to generate an output that is indicative of an optical parameter of the input signal.

In addition to generating an output that is indicative of an optical parameter of the input signal, the processor can also perform other functions such as determining optimal and minimum attenuation levels and controlling the magnitude of attenuation that is applied to the input signal. The functions of determining optimal and minimum attenuation levels are described in detail below. In the embodiment of FIG. 1, the processor includes an attenuation control module 122 for implementing the below described functions. In an embodiment, the attenuation control module includes function specific software for implementing the below described functions. In an embodiment, the processor and attenuation control module are embodied in a computer control system that is utilized to control operation of the optical heterodyne detection system.

In an embodiment, connection 126 is provided between the processor 116 and the attenuator 124 and connection 128 is provided between the processor and the local oscillator source 105. The connections allow the processor to control the attenuator and the local oscillator source.

Figure 2:
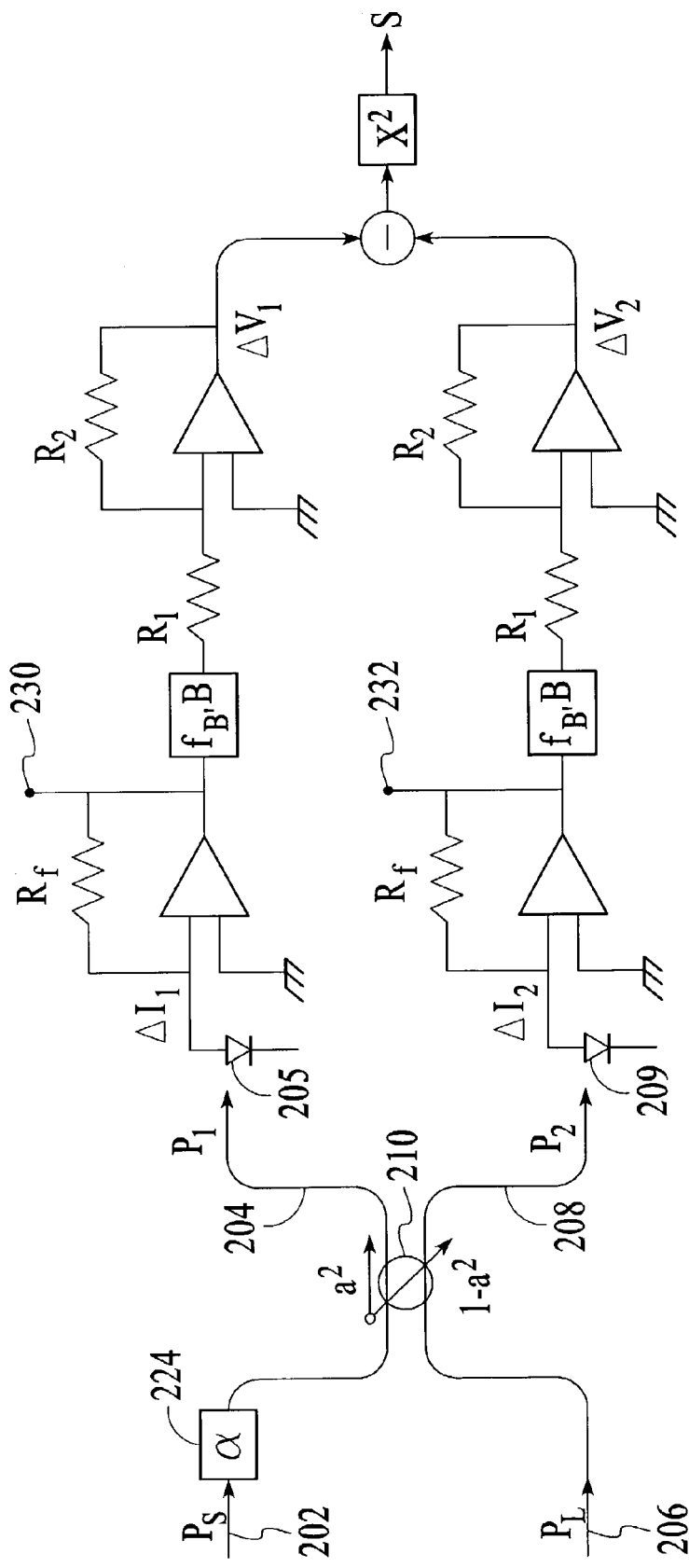
FIG. 2 depicts an expanded view of an example optical receiver in an optical heterodyne detection system, which includes intermediate detection points that can be utilized to protect the photodetectors from saturation or damage.

In the embodiment of FIG. 1, the optical receiver 112 includes photodetectors, amplifiers, resistors, and filters as is known in the field of optical heterodyne detection systems. FIG. 2 depicts an expanded view of an example optical receiver that can be utilized in an optical heterodyne detection system to achieve balanced detection. The optical receiver includes photodetectors, transimpedance amplifiers, bandpass filters, a subtractor, and a squaring unit. The transimpedance amplifiers convert photocurrents $\Delta i_1$ and $\Delta_2$ into voltages. The magnitude of the photocurrents $\Delta i_1$ and $\Delta i_2$ are proportional to the optical powers $P_1$ and $P_2$ and the photodetector responsivities. The voltages generated from the transimpedance amplifiers are passed through narrow bandpass filters at frequency $f_B$ with width B. The outputs from the filters are gained by second stage amplifiers with gain $G=R_2/R_1$. The subtractor subtracts the voltages $\Delta V_1$ and $\Delta V_2$ and the squaring unit squares the signal that is output from the subtractor.

Given the system and optical receiver depicted in FIG. 2, the input signal, $P_S$, is attenuated by a factor 'α' before being combined with the local oscillator signal, $P_L$, in the coupler 210. In the example, the coupler is assumed to have a through efficiency of $a^2$ and across efficiency of $1-a^2$, where $a^2=\frac{1}{2}$ for the case of an ideal 50:50 coupler. The optical signals at photodetectors 205 and 209 have the form, $$P_1 = a^2 P_L + (1-a^2)\alpha P_S + 2a\sqrt{1-a^2}\sqrt{P_L \alpha P_S}\cos(\Delta\omega \cdot t + \Delta\theta), \quad (3)$$

$$P_2 = (1-a^2) P_L + a^2 \alpha P_S - 2a\sqrt{1-a^2}\sqrt{P_L \alpha P_S}\cos(\Delta\omega \cdot t + \Delta\theta), \quad (4)$$

where $\Delta\omega$ (and $\Delta\theta$) are the difference frequency (and phase) of the heterodyne beat signal. For the case of a perfect coupler ($a^2=\frac{1}{2}$) the subtraction of $P_1$ and $P_2$ eliminates all but the heterodyne beat term. In general, perfect coupling is not realistic to achieve. In addition, variations in the responses of the two photodetectors introduce further differences that must be compensated for in order to extract the heterodyne beat term cleanly.

The signal which is ultimately measured by the optical heterodyne detection system includes the two output voltages ($\Delta V_1$ and $\Delta V_2$) from the respective detection circuits. As described above, the detection circuitry consists of transimpedance amplifiers that convert the photocurrents $\Delta i_1$ and $\Delta i_2$ into voltage. These voltages are passed through narrow bandpass filters at frequency $f_B$ with width B before being gained by the second stage amplifiers with gain $G=R_2/R_1$. The photocurrents $\Delta i_1$ and $\Delta i_2$ are related to the optical powers $P_1$ and $P_2$ through the photodiode responsivities which, in an embodiment, are on the order of 1 mA/mW. The final desired output signal is given by, $$S = (\Delta V_1 - \Delta V_2)^2 = \Delta V_1^2 + \Delta V_2^2 - 2\Delta V_1 \Delta V_2. \quad (5)$$

The measured signal consists of two components, the variances in the respective detectors given by $\Delta V_1^2$ and $\Delta V_2^2$, as well as the covariance between the detectors given by $\Delta V_1 \Delta V_2$. Optical shot noise and thermal noise are considered uncorrelated across the photodetectors and so only contribute to the detector variances. Intensity noise (RIN) as well as the heterodyne beat signal have a definite phase relation between the photodetectors (though of opposite sign) and therefore have contributions to both the variances and the covariance of the two photodetectors. It is assumed that the only frequency component seen at the receiver end is that component which is allowed by the bandpass filter. The RIN, shot, and thermal noise must be calculated at frequency $f_B$ with width B. The observed beat signal corresponds to that portion of $P_s(v_S)$ where the local oscillator signal, $P_L(v_L)$, is $|f_B|$ away in frequency (so that $\Delta v = v_L - v_S = \pm f_B$). As the local oscillator signal is swept across a frequency range, this maps out $P_s(v_S)$ as desired.

The variances and covariance of the output signals are given below:

$$\Delta V_1^2 = \mathcal{R}_1^2 G^2 R_f^2 \left[ \begin{array}{c} a^4(P_L^2(\text{shot}) + P_L^2(RIN)) + (1-a^2)^2 \\ (P_S^2(\text{shot}) + P_S^2(RIN)) + 4a^2(1-a^2)P_L\alpha P_S \end{array} \right] + J_1^2, \quad (6)$$

$$\Delta V_2^2 = \mathcal{R}_2^2 G^2 R_f^2 \left[ \begin{array}{c} (1-a^2)^2(P_L^2(\text{shot}) + P_L^2(RIN)) + a^4 \\ (P_S^2(\text{shot}) + P_S^2(RIN)) + 4a^2(1-a^2)P_L\alpha P_S \end{array} \right] + J_2^2, \quad (7)$$

$$\Delta V_1 \Delta V_2 = \mathcal{R}_1 \mathcal{R}_2 G^2 R_f^2 a^2 (1-a^2)[P_L^2(RIN) + P_S^2(RIN) - 4P_L\alpha P_S], \quad (8)$$

where, $$P_L^2(\text{shot}) = 2q \cdot \langle P_L \rangle \cdot B \quad (9)$$

$$P_S^2(\text{shot}) = 2q \cdot \alpha \cdot \langle P_S \rangle \cdot B \quad (10)$$

$$P_L^2(RIN) = RIN(f_B) \cdot B \cdot \langle P_L \rangle^2 \quad (11)$$

$$P_S^2(RIN) = RIN(f_B) \cdot B \cdot \alpha^2 \cdot \langle P_S \rangle^2 \quad (12)$$

$$J_1^2 = J_2^2 = 4 \cdot K_B \cdot T \cdot B \cdot [G^2 R_f + G^2 R_1 + R_2] \quad (13)$$

and where 'a' is the coupler efficiency parameter, the response of the two photodetectors is given by $R_{1,2}$, the thermal noise of each circuit is given by $J_{1,2}$, the various circuit gains given by G and $R_f$ have been defined previously, and the RIN/shot noise terms have been explicitly stated. These "noise" terms must be evaluated at the passband frequency $f_B$. The beat term $P_L P_S$ is related to the spectral components $P_L(v_L)$ and $P_S(v_S)$ which are separated by $f_B$ in frequency. By assuming that $a^2 \sim \frac{1}{2}$, the signal S can be calculated to be:

$$S = (\Delta V_1 - \Delta V_2)^2 \quad (14)$$

$$= \mathcal{R}^2 G^2 R_f^2 \left[ \begin{array}{c} \frac{1}{2} P_L^2(\text{shot}) + \frac{1}{2} P_S^2(\text{shot}) + \Delta_L P_L^2(RIN) + \\ \Delta_S P_S^2(RIN) + 4P_L\alpha P_S \end{array} \right] + J_1^2 + J_2^2,$$

where average detector responses and gains (R, G, $R_f$) are assumed with variations encompassed in the subtraction parameters $\Delta_L$ and $\Delta_S$ for the RIN noise.

Operation of the heterodyne based OSA with controlled attenuation is described with reference to FIGS. 1–9. In operation, the input signal 102 is transmitted through the attenuator 124 and the input signal is attenuated to a desired level. The attenuated input signal is then directed through the input fiber 104 towards the optical coupler 110. Simultaneously, the local oscillator source 105 generates a swept local oscillator signal 106 that is transmitted through the local oscillator fiber 108 to the optical coupler. The attenuated input signal 102 and the swept local oscillator signal 106 are combined by the optical coupler into a combined optical signal. The combined optical signal is output onto output fibers 118 and 120 and transmitted to the heterodyne receiver 112. The combined optical signals are detected and mixed by the heterodyne receiver and a heterodyne beat signal is generated in response to the combined optical signal. The heterodyne beat signal is output to the processor 116. The processor utilizes the heterodyne beat signal to generate an output that is indicative of an optical parameter of the input signal, such as wavelength, frequency, or amplitude.

As described above, attenuating the input signal to improve the signal to noise ratio is preferably performed when the intensity noise of the input signal is the dominant noise source. Under this condition, attenuating the input signal improves the signal to noise ratio of the heterodyne beat signal because the intensity noise of the input signal and the heterodyne beat signal scale differently with attenuation of the input signal. Preferably, the input signal is attenuated to a level that maximizes the signal to noise ratio of the heterodyne beat signal. In an embodiment, the input signal is attenuated to an optimal attenuation level, where the optimal attenuation level is defined as the attenuation level that produces a signal to noise ratio that is at, or near, the maximum signal to noise ratio that is achievable through attenuation of the input signal. For example, the optimal attenuation level may achieve a signal to noise ratio that is within a few dB of the maximum signal to noise ratio that is achievable through attenuation of the input signal. In an embodiment, the signal to noise ratio is maximized when the input signal is attenuated such that the intensity noise of the input signal is approximately equal to the next largest noise source. For example, the next largest noise source may be the shot noise of the local oscillator signal, the shot noise of the input signal, the intensity noise of the local oscillator signal, electrical noise from the optical receiver, or some combination thereof.

The optimal attenuation level for a particular input signal can be determined by directly measuring the heterodyne beat signal and the noise as a function of attenuation over a range of different attenuation levels, calculating the corresponding signal to noise ratio at each different attenuation level, and then identifying the attenuation level that corresponds to the maximum signal to noise ratio. Although this is a reliable technique for determining the optimal attenuation level, the technique requires measuring the heterodyne beat signal multiple times at different attenuation levels so that the signal to noise ratio can be calculated. Measuring the heterodyne beat signal multiple times at different attenuation levels is time consuming and can introduce unwanted error.

In an embodiment in accordance with the invention, the optimal attenuation level for an input signal is determined without obtaining measurements of the heterodyne beat signal. Specifically, the optimal attenuation level is calculated from various noise measurements. In an embodiment, the optimal attenuation level for an input signal is determined by obtaining various noise measurements as a function of attenuation, fitting the obtained noise measurements to a signal versus attenuation curve, and then using data from the curve fit to calculate the optimal attenuation level.

For an optical heterodyne detection system, the output signal, S, as a function of attenuation, $\alpha$, (where $\alpha=0$ at maximum attenuation and $\alpha=1$ at minimum attenuation) can be expressed as:

$$S(\alpha) = A\alpha^2 + (B+D)\alpha + C \quad (15)$$

where the various constants are;

$$A = \Delta_S \cdot RIN_S \cdot B \cdot \langle P_S \rangle^2, \quad (16)$$

$$B = q \cdot B \cdot \langle P_S \rangle, \quad (17)$$

$$C = q \cdot B \cdot \langle P_L \rangle + \Delta_L \cdot RIN_L \cdot B \cdot \langle P_L \rangle^2 + \frac{J_1^2 + J_2^2}{\mathcal{R}^2 G^2 R_f^2}, \quad (18)$$

$$D = 4 \cdot \langle P_L \rangle \cdot \langle P_S \rangle \cdot \frac{B}{\Delta v_S}. \quad (19)$$

In the above expression, the A term represents the intensity noise of the input signal, the B term represents the shot noise of the input signal, and the C term represents the combination of the noise from the local oscillator signal and the optical receiver. The D term represents the heterodyne beat portion of the signal, S, (referred to herein as the heterodyne beat signal or $S_{hb}$)

Given the above expression, the ratio of the heterodyne beat signal to the noise (referred to herein as the signal to noise ratio) as a function of attenuation can be expressed as:

$$S_{hb}(\alpha)/N(\alpha) = D\alpha/(A\alpha^2 + B\alpha + C) \quad (20)$$

Given the signal to noise expression, the optimal value of $\alpha$ that maximizes the signal to noise ratio can be found by taking the derivative of the signal to noise expression, setting the derivative equal to zero, and solving for $\alpha$. Performing this calculation gives an expression of the optimal attenuation level in terms of predefined constants as:

$$\alpha_{opt} = \sqrt{\frac{C}{A}} \quad (21)$$

To compute the optimal attenuation level, $\alpha_{opt}$, the values of the constant terms A and C must be determined. As stated above, the C term represents the combination of noise from the local oscillator signal and from the receiver and is not a function of $\alpha$. The C term can be determined by measuring the output signal that is produced in response to the local oscillator signal in the absence of the input signal. The measurement of the output signal in response to the local oscillator signal and in the absence of the input signal is referred to herein as the "base measurement." In one embodiment, the C term is determined in the presence of the local oscillator signal before the input signal is introduced to the system. In another embodiment, the C term is determined in the presence of the local oscillator signal while the input signal is completely attenuated.

As stated above, the A term represents the intensity noise of the input signal. Since the A term is the only term that varies quadratically with attenuation (i.e., $\alpha$) the A term can be determined by taking the second derivative of the output signal, S, with respect to $\alpha$. This can be done with or without the local oscillator signal present. The resulting relationship is:

$$A = \frac{1}{2} \delta^2 S / \delta \alpha^2, \quad (22)$$

$$\text{where, } S = (\Delta V_1 - \Delta V_2)^2. \quad (23)$$

To measure the second derivative, sample measurements of the output signal, S, are taken at different attenuation levels. The sample measurements of the output signal are then fit to an output signal versus attenuation (i.e., S vs. $\alpha$) curve. In an embodiment, the sample measurements of the output signal are fit to the second degree polynomial S vs. $\alpha$ curve. In an embodiment, the measurements of the output signal are fit to the second degree polynomial using a non-linear fitting routine, such as least squares minimization. In an embodiment, the sample measurements are taken in the absence of the local oscillator signal (because there is no local oscillator signal, no heterodyne beat signal is generated). The sample measurements can be taken with both the local oscillator signal and the input signals present (although a heterodyne beat signal may be present as the result of mixing, the heterodyne beat signal is not extracted from the noise signals).

In the case where the intensity noise of the input signal is not measurable, the A term should be set to zero, which indicates that no increase in the signal to noise ratio is achieved through attenuation of the input signal. If the A term obtained from the sample measurements is too small, the value of $\alpha_{opt}$ should be limited to a maximum value of "1" or to a value that keeps the photodetectors unsaturated.

Figure 3:
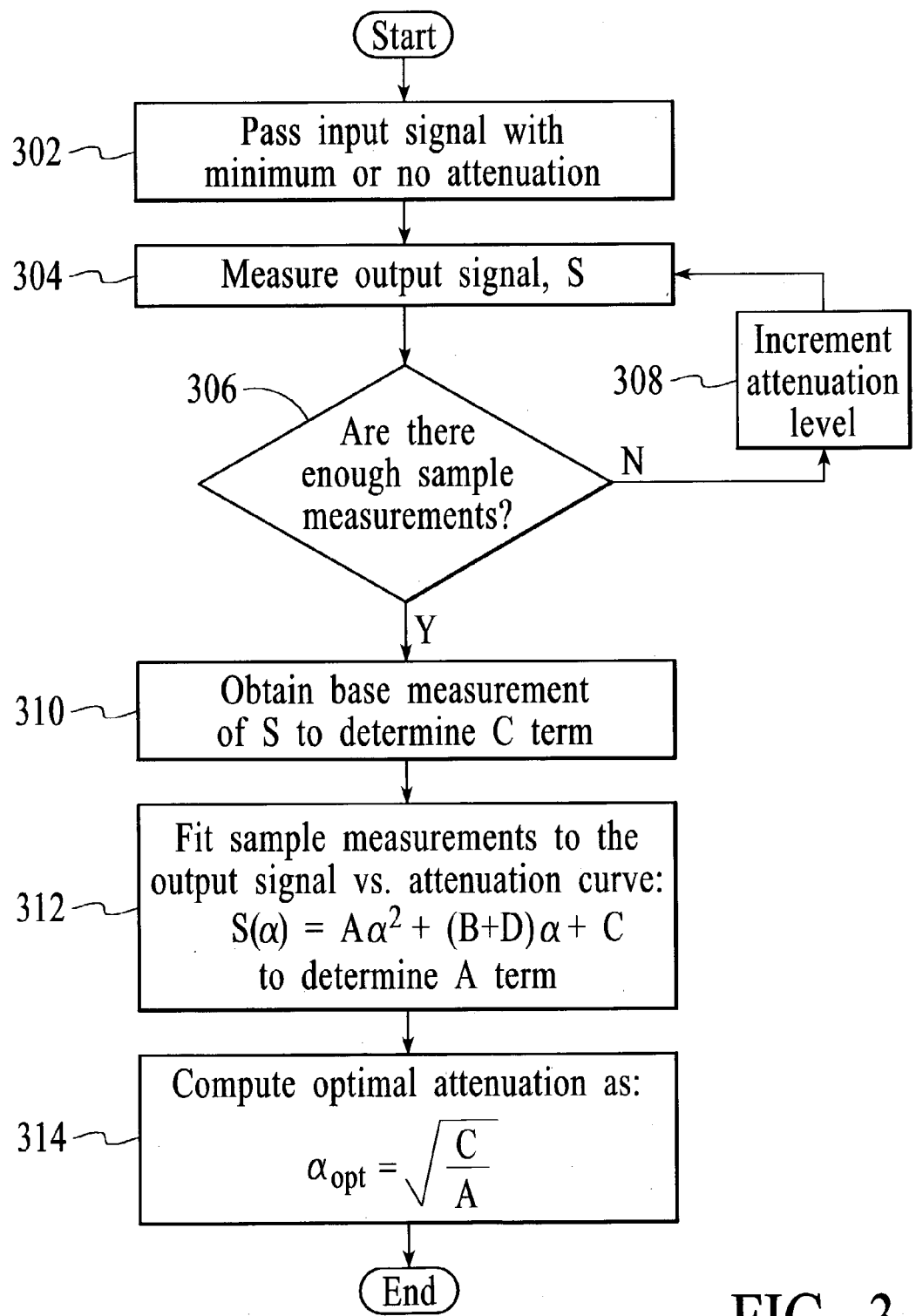
FIG. 3 depicts an embodiment of a process flow diagram for determining the optimal attenuation level for an input signal in an optical heterodyne detection system.

FIG. 3 depicts an embodiment of a process flow diagram for determining the optimal attenuation level for an input signal in an optical heterodyne detection system. At block 302, the input signal is passed through the attenuator with no attenuation or the minimum allowed attention (determination of the minimum allowed attenuation is described below). At block 304, the output signal, S, is measured in response to the attenuated input signal. At decision block 306, it is determined whether or not enough sample measurements of the output signal have been obtained. If it is determined that there are not enough sample measurements, then at block 308, the attenuation level is incremented. That is, the level of attenuation applied to the input signal is increased by some incremental amount. Looking at attenuation in terms of $\alpha$, incrementing the attenuation level involves decrementing $\alpha$. In an embodiment, the attenuation level is incremented in intervals of 2–7 dB, although other intervals may be used. After the attenuation level is incremented, at block 304, the output signal is measured again.

Returning to decision block 306, if it is determined that there are enough sample measurements, then at block 310, a base measurement of the output signal is obtained. In an embodiment, the base measurement of the output signal is used to find the C term in the expression of $\alpha_{opt}$. Because the C term represents the combination of the noise from the local oscillator signal and the receiver, the base measurement is obtained in the presence of the local oscillator signal and the absence of the input signal. After obtaining the base measurement, at block 312, the sample measurements of the output signal are fit to an output signal vs. attenuation curve. In an embodiment, the sample measurements are fit to the second degree polynomial expression of the output signal as a function of attenuation: $S(\alpha) = A\alpha^2 + (B+D)\alpha + C$. After the A and C terms are determined, at block 314, the optimal attenuation is computed from the expression:

$$\alpha_{opt} = \sqrt{\frac{C}{A}} \quad (21)$$

The process flow diagram of FIG. 3 depicts a particular order to the process steps. The process steps can be changed from the order depicted in FIG. 3 without deviating from the scope of the invention. For example, in an alternative embodiment, the process steps can be ordered such that incrementing the attenuation level (block 308) is performed after measuring the output signal (block 300) but before determining whether or not there are enough sample measurements (decision point 306). In addition, in an alternative embodiment, the base measurement can be obtained (block 310) before the sample measurements are obtained (block 304) or after the sample measurements are fit to the output signal vs. attenuation curve (block 312). In another alternative, the sample measurements can be obtained by setting the initial attenuation level high and decrementing the attenuation level to obtain the needed sample measurements. In another alternative, the sample measurements can be obtained by randomly varying the attenuation level.

The number of samples that are sufficient to characterize the output signal vs. attenuation response is implementation specific. In an embodiment, at least three sample measurements are obtained to fit to an output signal vs. attenuation curve.

Figure 4:
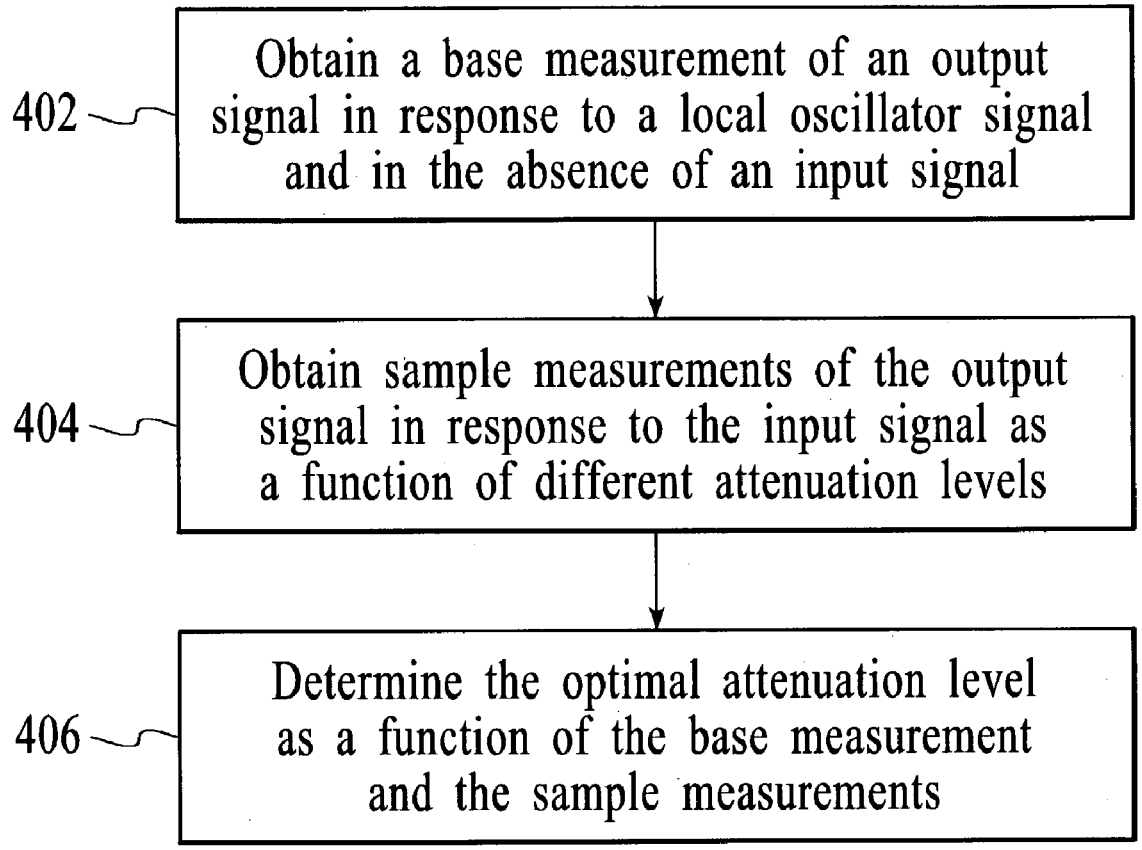
FIG. 4 depicts another embodiment of a process flow diagram for determining the optimal attenuation level for an input signal in an optical heterodyne detection system.

FIG. 4 depicts another embodiment of a process flow diagram for determining the optimal attenuation level for an input signal in an optical heterodyne detection system. At block 402, a base measurement of the output signal is obtained in response to the local oscillator signal and in the absence of the input signal. At block 404, sample measurements of the output signal are obtained in response to the input signal as a function of different attenuation levels. At block 406, the optimal attenuation level is determined as a function of the base measurement and the sample measurements.

In addition to controlling attenuation to improve the signal to noise ratio of the heterodyne beat signal, the attenuation can be controlled to protect the photodetectors from becoming saturated or permanently damaged. In an embodiment, the direct current (DC) voltage related to each photodetector is monitored from an intermediate detection point for purposes of protecting the photodetectors. For example, referring to FIG. 2, the DC voltages generated in response to received optical signals are monitored from detection points 230 and 232 that are before the respective bandpass filters. That is, the detection points are located such that the DC voltage output of the transimpedance amplifiers is measured before bandpass filtering.

Example processes for controlling the attenuation of the input signal to protect the photodetectors of an optical heterodyne detection system are described with regard to three different situations, "cold start," normal operation, and "power down." At a cold start, the photodetectors should be protected from a surge of optical power from the input signal. Protecting the photodetectors from a surge of optical power is accomplished by initially setting the attenuation to a maximum attenuation level at power up and then gradually reducing the attenuation of the input signal until the photodetectors reach an identified DC voltage limit. The point at which the photodetectors reach their DC voltage limit is established as the minimum attenuation level that should be allowed. That is, to protect the photodetectors from becoming saturated or damaged from a power surge at start up, the attenuation of the input signal should not be allowed to drop below the established minimum attenuation level. Because attenuation is described in terms of $\alpha$, where $\alpha=0$ at maximum attenuation and $\alpha=1$ at minimum attenuation, the minimum attenuation level is represented by the maximum value of $\alpha$, or $\alpha_{max}$. That is, $\alpha_{max}$ is the minimum attenuation level that should be applied to the input signal to protect the photodetectors from damage.

As defined herein, the DC voltage limit (also referred to as the voltage limit) of a photodetector is the measured voltage beyond which the photodetector cannot be assumed to provide a linear response. That is, a photodetector is assumed to have a linear response for measured voltages up to and including the voltage limit. For measured voltages beyond the voltage limit, a linear response cannot be assumed. In an embodiment, the voltage limit is a value that is pre-established as a function of the photodetector characteristics.

Figure 5:
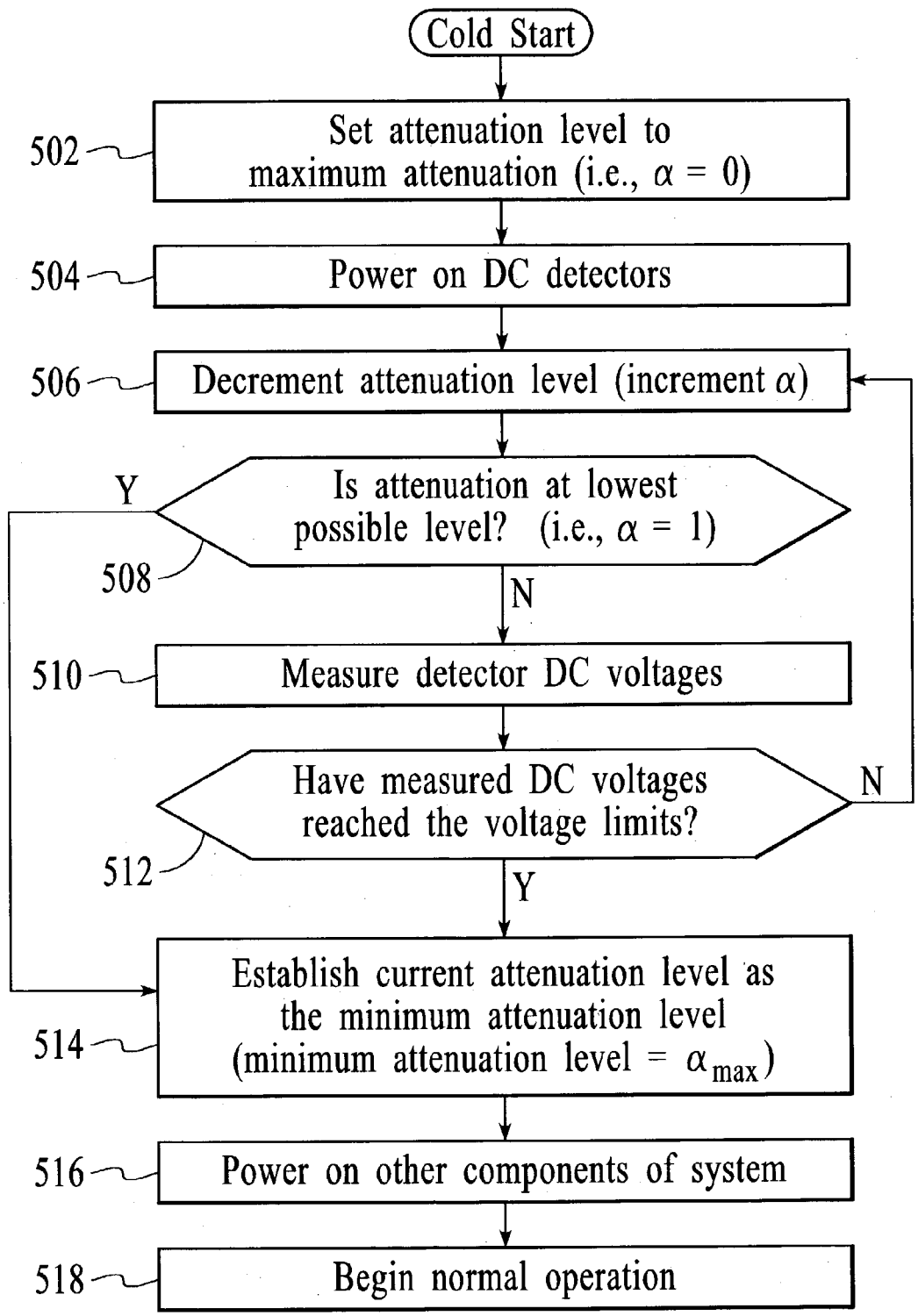
FIG. 5 depicts an embodiment of a process flow diagram for determining a minimum attenuation level upon a cold start of an optical heterodyne detection system.

FIG. 5 depicts a process flow diagram of a technique for determining a minimum attenuation level upon a cold start of an optical heterodyne detection system. At block 502, the attenuation level is set to a maximum level (i.e., $\alpha=0$). At block 504, the DC detection points are powered on. At block 506, the attenuation level is decremented from the current attenuation level. That is, the attenuation level is reduced by an incremental amount. Looking at attenuation in terms of $\alpha$, decrementing the attenuation level involves incrementing $\alpha$. At block 508, it is determined whether the attenuation is at the lowest possible attenuation level (i.e., no attenuation or $\alpha=1$). If the attenuation is at the lowest possible attenuation level, then at block 514, the minimum attenuation level is set as the lowest possible attenuation level (i.e., $\alpha_{max}=1$). If the attenuation level is not at the lowest attenuation level, then at block 510, the DC voltage related to each photodetector is measured. At block 512, a determination is made as to whether the measured DC voltage of each photodetector has reached the DC voltage limit of the respective photodetector. If the DC voltage has not reached the DC voltage limit, then the process returns to block 506, where the attenuation level is decremented again. If the DC voltage has reached the DC voltage limit, then at block 514 the current attenuation level is established as the minimum attenuation level. Looking at attenuation in terms of $\alpha$, the current attenuation level is stored as $\alpha_{max}$. After the minimum attenuation level is established, other components of the optical heterodyne detection system (i.e., LO source, modulator) are powered on, block 516, and the system is ready to enter normal operation, block 518.

During normal operation, the photodetectors should be protected from a surge of optical power from the input signal. Protecting the photodetectors from a surge of optical power is accomplished by actively monitoring the DC voltage related to the photodetectors, setting the attenuation to a maximum attenuation level if the photodetectors become saturated, and then gradually reducing the attenuation of the input signal until the photodetectors reach a pre-established DC voltage limit. The point at which the photodetectors reach their DC voltage limit is established as the minimum attenuation level that should be allowed during normal operation. That is, to protect the photodetectors from becoming saturated or damaged during normal operation and to ensure that the photodetectors operate in their linear response range, the attenuation of the input signal should not be allowed to drop below the minimum attenuation level that is established in response to the DC voltage limit. As stated above, because attenuation is described in terms of $\alpha$, where $\alpha=0$ at maximum attenuation and $\alpha=1$ at minimum attenuation, the minimum attenuation level is represented by the maximum value of $\alpha$, or $\alpha_{max}$. That is, $\alpha_{max}$ is the minimum attenuation level that should be applied to the input signal to protect the photodetectors from damage.

Figure 6:
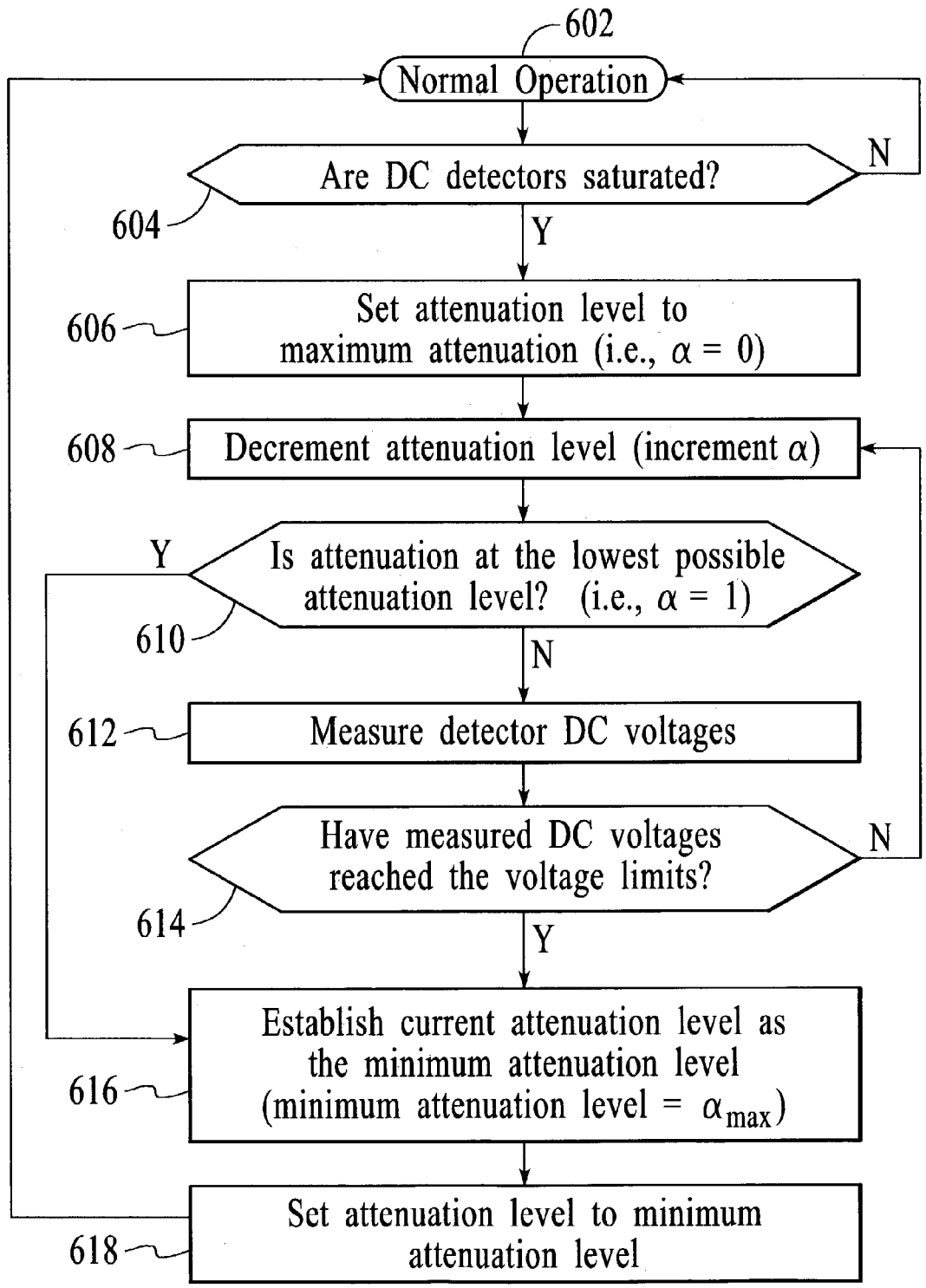
FIG. 6 depicts an embodiment of a process flow diagram for determining a minimum attenuation level during normal operation of an optical heterodyne detection system.

FIG. 6 depicts a process flow diagram of a technique for determining a minimum attenuation level during normal operation of an optical heterodyne detection system. At block 602, the optical heterodyne detection system is in a normal operating mode. At decision block 604, a determination is made as to whether or not the photodetectors are saturated. In an embodiment, determining whether or not the DC detectors are saturated involves looking at the DC power levels and determining if the DC power levels are in the operating range. In an embodiment, this determination is made in response to periodic measurements of the DC voltages at the DC detection points. For example, the DC detection points may be monitored after every sweep of the local oscillator signal. If the photodetectors are not saturated, then the normal operation continues (block 602). If the photodetectors are saturated, then at block 606, the attenuation level is set to a maximum level (i.e., α=0). At block 608, the attenuation level is decremented from the current attenuation level. That is, the attenuation level is reduced by an incremental amount. Looking at attenuation in terms of α, decrementing the attenuation level involves incrementing α. In an embodiment, the attenuation level is decremented from the initial level on the first iteration and from the reduced attenuation levels on subsequent iterations. At decision block 610, it is determined whether the attenuation is at the lowest possible attenuation level (i.e., no attenuation or α=1). If the attenuation is at the lowest possible attenuation level, then at block 616, the minimum attenuation level is set as the lowest possible attenuation level (i.e., $\alpha_{max}=1$). If the attenuation level is not at the lowest attenuation level, then at block 612, the DC voltage related to the detectors is measured. At decision block 614, a determination is made as to whether the measured DC voltage has reached the DC voltage limit of the photodetectors. If the DC voltage has not reached the DC voltage limit, then the process returns to block 608, where the attenuation level is decremented again. If the DC voltage has reached the DC voltage limit, then at block 616 the current attenuation level is established as the minimum attenuation level. Looking at attenuation in terms of α, the current attenuation level is stored as $\alpha_{max}$. After the minimum attenuation level (i.e., $\alpha_{max}$) is established, at block 618, the attenuation level is set to the minimum attenuation level and the system returns to normal operation (block 602).

Figure 7:
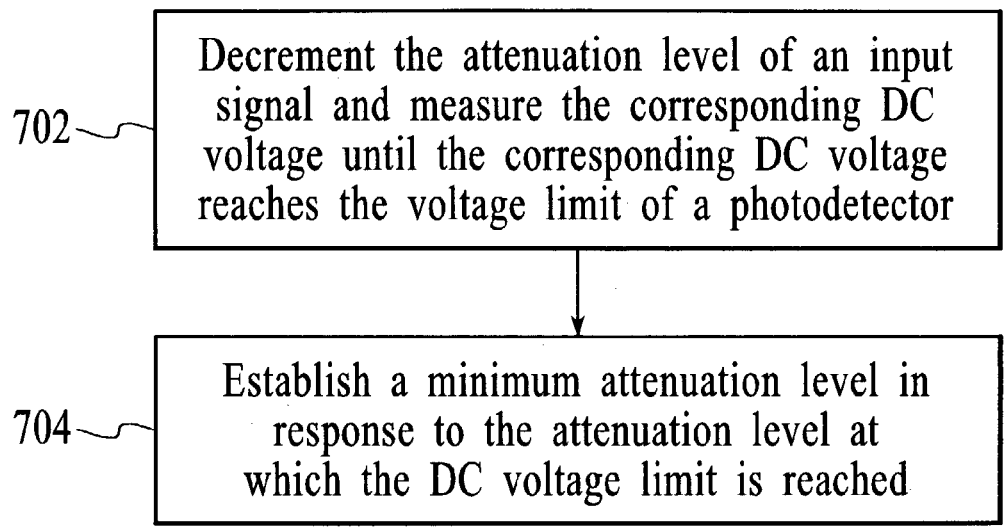
FIG. 7 depicts another embodiment of a process flow diagram for determining a minimum attenuation level during normal operation of an optical heterodyne detection system.

FIG. 7 depicts another embodiment, in accordance with the invention, of a process flow diagram for determining a minimum attenuation level during operation of an optical heterodyne detection system. At block 702, the attenuation level of an input signal is decremented and the corresponding DC voltage is measured until the corresponding DC voltage reaches the voltage limit of a photodetector. At block 704, a minimum attenuation level is established in response to the attenuation level at which the DC voltage limit is reached.

Figure 8:
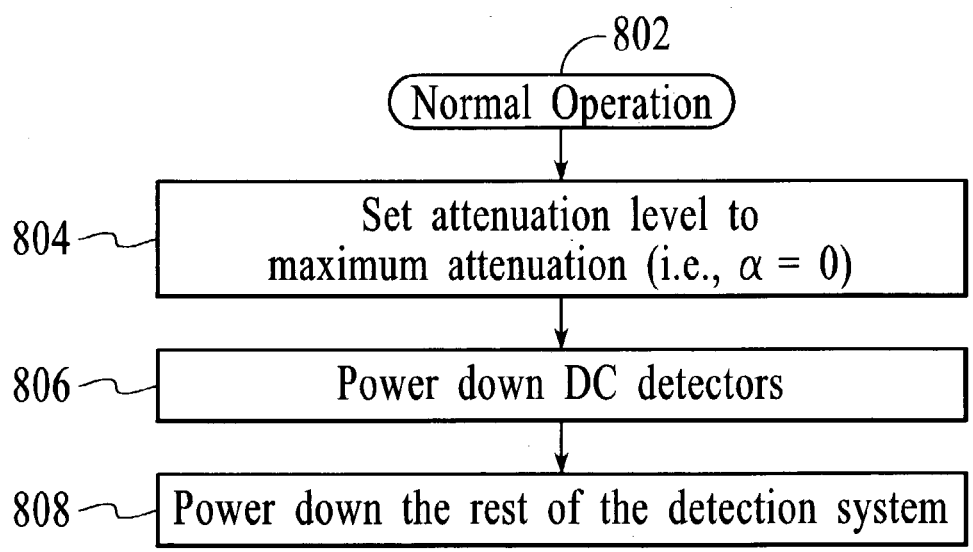
FIG. 8 depicts a process flow diagram for powering down an optical heterodyne detection system.

At a power down, the photodetectors should be left protected from a surge of optical power from possible input signals. For example, the photodetectors could be damaged if a high powered input signal is injected into the system. In an embodiment, the photodetectors are protected from a surge of optical power by setting the attenuation level to a maximum attenuation level before the photodetectors are powered down. FIG. 8 depicts a process flow diagram of a technique for powering down an optical heterodyne detection system. At block 802, the system is in normal operation. Upon initiation of a power down, at block 804, the attenuation level is set to the maximum attenuation level. After the attenuation level is set to the maximum attenuation level, at block 806, the photodetectors are powered down. After the photodetectors are powered down, at block 808, the rest of the optical heterodyne detection system can be powered down without damaging the photodetectors.

Figure 9:
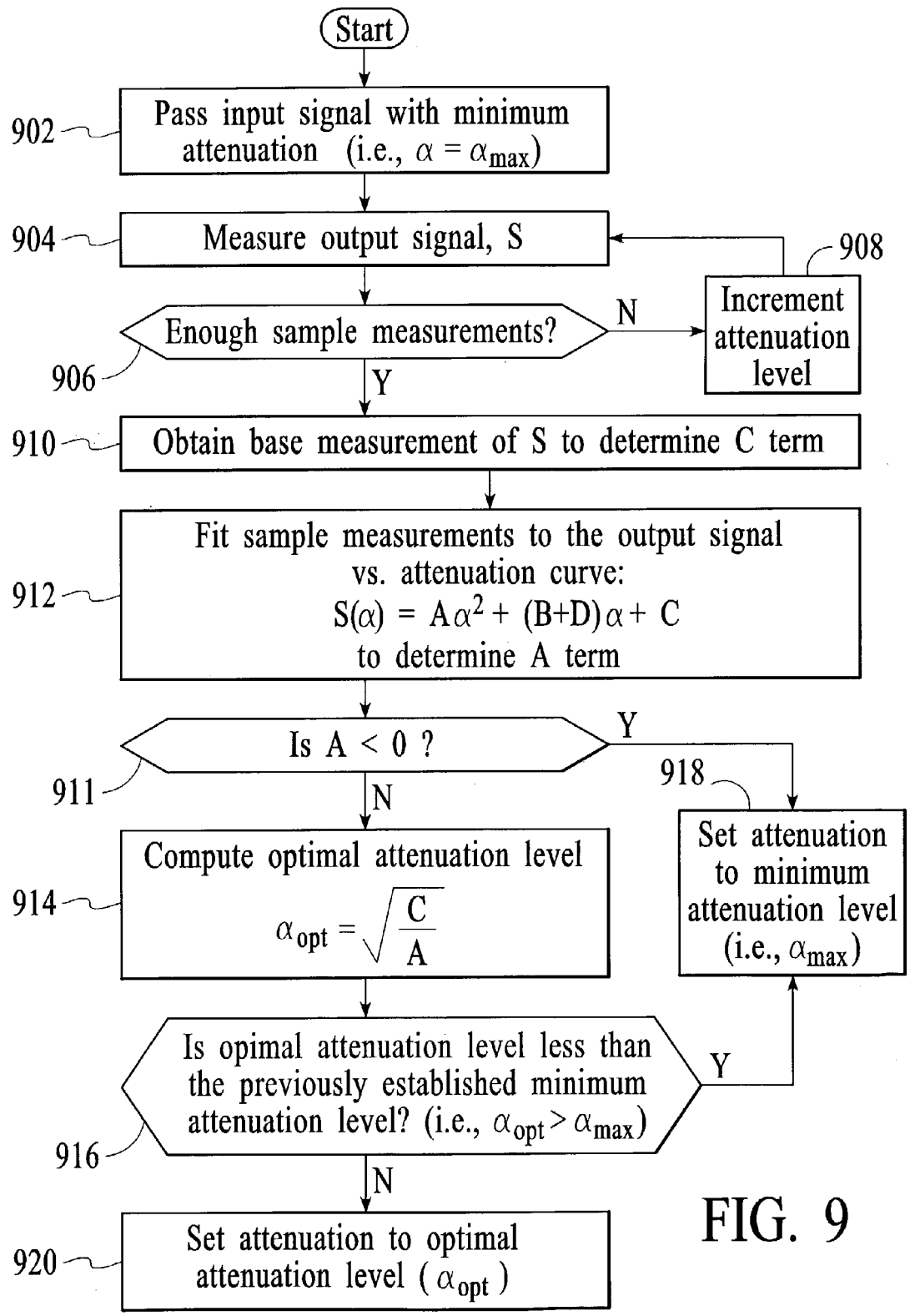
FIG. 9 depicts a process flow diagram of a technique for controlling the attenuation level of an input signal to improve the signal to noise ratio of the heterodyne beat signal, wherein the low end range of attenuation is limited by a previously established minimum attenuation level (i.e., $\alpha_{max}$)

In an embodiment, the level of attenuation can be controlled to accomplish both protection of the photodetectors and improvement of the signal to noise ratio. In particular, once a minimum attenuation level (i.e., $\alpha_{max}$) is determined as described with reference to FIGS. 5 and 6 to prevent saturation and damage of the photodetectors, adjustment of the attenuation level for purposes of improving the signal to noise ratio is limited by the minimum attenuation level. That is, the signal to noise ratio of the heterodyne beat signal can be improved by adjusting the attenuation level as long as the attenuation level is maintained at or above the minimum attenuation level. FIG. 9 depicts a process flow diagram of a technique for controlling the attenuation level to improve the signal to noise ratio of the heterodyne beat signal, wherein the low end range of attenuation is limited by a previously established minimum attenuation level (i.e., $\alpha_{max}$). At block 902, the minimum attenuation level is applied to the input signal (i.e., $\alpha_{max}$), where the minimum attenuation level is a pre-determined value. At block 904, the output signal, S, is measured in response to the attenuated input signal. At decision block 906, it is determined whether or not enough sample measurements of the output signal have been obtained. If it is determined that there are not enough sample measurements, then at block 908, the attenuation level is incremented. That is, the level of attenuation applied to the input signal is increased by some incremental amount. In an embodiment, the attenuation level is incremented in intervals of 2–7 dB, although other intervals may be used. After the attenuation level is incremented, at block 904, the output signal is measured again.

Returning to decision block 906, if it is determined that there are enough sample measurements, then at block 910, a base measurement of the output signal is obtained. In an embodiment, the base measurement of the output signal is used to find the C term in the expression of $\alpha_{opt}$. Because the C term represents the combination of the noise from the local oscillator signal and the receiver, the base measurement is obtained in the presence of the local oscillator signal and the absence of the input signal. After obtaining the base measurement, at block 912, the sample measurements of the output signal are fit to an output signal vs. attenuation curve. In an embodiment, the sample measurements are fit to the second degree polynomial expression of the output signal as a function of attenuation: $S(\alpha)=A\alpha^2+(B+D)\alpha+C$. After the A term is determined, at decision block 911, it is determined whether A is less than zero. If A is less than zero, then the minimum attenuation level is set to the previously established minimum attenuation level (i.e., $\alpha_{max}$). If A is not less than zero, then at block 914, the optimal attenuation level is computed from the expression:

$$\alpha_{opt} = \sqrt{\frac{C}{A}} \qquad (21)$$

At decision block 916, it is determined whether the optimal attenuation level is less than the previously established minimum attenuation level. If the optimum attenuation level is less than the previously established minimum attenuation level, then at block 918 the attenuation level is set at the previously established minimum attenuation level. That is, the attenuation level is not allowed to drop below the minimum attenuation level that was previously established to protect the photodetectors even if the lower attenuation level will improve the signal to noise ratio. If the optimal attenuation level is above the minimum attenuation level, then at block 920 the attenuation level is set at the optimal attenuation level. That is, the attenuation level is set at the optimal attenuation level as long as the optimal attenuation level is above the minimum attenuation level.

Although the optical components of the optical heterodyne detection system are described as being connected by optical fibers, the individual devices may be integrated onto a monolithic device, such as a planar waveguide circuit. Alternatively, the optical elements may be connected by free space.

It shall be appreciated that not all method steps described herein must be performed, nor must they be performed in the order described.

Although specific embodiments in accordance with the invention have been described and illustrated, the invention is not limited to the specific forms and arrangements of parts so described and illustrated. The invention is limited only by the claims.

What is claimed is:

1. A method for determining an optimal attenuation level for an input signal in an optical heterodyne detection system wherein said optical heterodyne detection system includes an optical coupler for combining said input signal with a local oscillator signal to form a combined optical signal, a receiver that is optically coupled to said optical coupler for generating an output signal in response to one of said input signal, said local oscillator signal, and said combined optical signal, and an attenuator tat is optically coupled to said optical coupler for attenuating said input signal, said method comprising steps of:
    obtaining a base measurement of said output signal in response to said local oscillator signal and in the absence of said input signal;
    obtaining sample measurements of said output signal in response to said input signal as a function of difibrent attenuation levels; and
    determining said optimal attenuation level as a function of said base measurement and said sample measurements, wherein determining said optimal attenuation level comprises:
        identifying: an intensity noise characteristic of said input signal from said sample measurements; and
        utilizing said intensity noise characteristic in said determination of said optimal attenuation level.

2. The method of claim 1 wherein said sample measurements are obtained in the absence of said local oscillator signal.

3. The method of claim 1 wherein identifying an intensity noise characteristic of said Input signal from said sample measurements includes fitting said sample measurements to a second degree polynomial.

4. The method of claim 3 further including determining an intensity noise constant, A, from said fit of said sample measurements.

5. The method of claim 4 wherein at least three sample measurements are obtained and fit to said second degree polynomial.

6. The method of claim 4 wherein said step of obtaining said base measurement further includes determining a noise constant, C, from said base measurement.

7. The method of claim 6 wherein said step of determining said optimal attenuation level includes determining said optimal attenuation level as a function of:

$$\alpha_{opt} = \sqrt{\frac{C}{A}}.$$

8. A system for optical heterodyne detection comprising:
    an adjustable attenuator for attenuating an input signal;
    an optical coupler coupled to receive said input signal from said attenuator and to receive a local oscillator signal;
    an optical receiver coupled to receive a combined optical signal from said optical coupler; and
    an attenuation control module for:
        obtaining a base measurement of said output signal in response to said local oscillator signal and in the absence of said input signal;
        obtaining sample measurements of said output signal in response to said input signal as a function of different attenuation levels; and
        determining an optimal attenuation level for said attenuator as a function of said base measurement and said sample measurements, wherein determining said optical attenuation level comprises:
            identifying an intensity noise characteristic of said input signal from said sample measurements; and
            utilizing said intensity noise characteristic in said determination of said optimal attenuation level.

9. The system of claim 8 wherein said sample measurements are obtained in the absence of said local oscillator signal.

10. A method for determining a minimum attenuation level for an input signal in an optical heterodyne detection system wherein said optical heterodyne detection system includes an optical coupler for combining said input signal with a local oscillator signal to form a combined optical signal, a receiver that is optically coupled to said optical coupler for generating an output signal in response to one of said input signal, said local oscillator signal, and said combined optical signal, and an attenuator that is optically coupled to said optical coupler for attenuating said input signal, said receiver including at least one photodetector that has an associated voltage limit, said method comprising steps of:
    decrementing the attenuation level of said input signal and measuring the corresponding DC voltage until said corresponding DC voltage reaches said voltage limit of said at least one photodetector; and
    establishing a minimum attenuation level in response to the attenuation level at which said DC voltage limit is reached.

11. The method of claim 10 wherein said DC voltage is measured before being filtered.

12. The method of claim 10 wherein said minimum attenuation level is established at the attenuation level at which said DC voltage limit is reached.

13. The method of claim 10 further including setting an initial attenuation level to a maximum attenuation level before said attenuation level is decremented.

14. The method of claim 10 further including determining whether said at least one photodetector is saturated and initiating said steps of decrementing and establishing only if said at least one photodetector is saturated.

15. The method of claim 10 further including establishing an optimal attenuation level, wherein said step of establishing said optimal attenuation level comprises;
    obtaining a base measurement of said output signal in response to said local oscillator signal and in the absence of said input signal;
    obtaining sample measurements of said output signal in response to said input signal as a function of different attenuation levels; and
    determining said optimal attenuation level as a function of said base measurement and said sample measurements.

16. A system for optical heterodyne detection comprising:
    an adjustable attenuator for attenuating an input signal;

an optical coupler coupled to receive said input signal from said attenuator and to receive a local oscillator signal;

an optical receiver coupled to receive a combined optical signal from said coupler, said optical receiver including at least one photodetector having an associated voltage limit and an intermediate detection point for measuring a direct current (DC) voltage related to said at least one photodetector; and an attenuation control module for:

decrementing the attenuation level of said adjustable attenuator until the corresponding DC voltage, as measured from said intermediate detection point, reaches said voltage limit of said at least one photodetector; and establishing a minimum attenuation level in response to the attenuation level at which said DC voltage is reached.

17. The system of claim 16 wherein said intermediate detection point is located before a filter that is arranged to filter said DC voltage.

* * * * *

UNITED STATES PATENT AND TRADEMARK OFFICE
CERTIFICATE OF CORRECTION

PATENT NO. : 7,012,697 B2 Page 1 of 1
APPLICATION NO. : 10/279436
DATED : March 14, 2006
INVENTOR(S) : McAlexander et al.

It is certified that error appears in the above-identified patent and that said Letters Patent is hereby corrected as shown below:

In column 15, line 21, in Claim 1, delete "tat" and insert -- that --, therefor.

In column 15, line 28, in Claim 1, delete "difibrent" and insert -- different --, therefor.

In column 15, line 34, in Claim 1, delete "identifying:" and insert -- identifying --, therefor.

In column 15, line 42, in Claim 3, delete "Input" and insert -- input --, therefor.

In column 16, line 3, in Claim 8, delete "for:" and insert -- for; --, therefor.

In column 17, line 10, in Claim 16, delete "for:" and insert -- for; --, therefor.

Signed and Sealed this

Eighth Day of August, 2006

JON W. DUDAS
*Director of the United States Patent and Trademark Office*